(12) United States Patent
Smerdon et al.

(10) Patent No.: US 12,346,249 B2
(45) Date of Patent: Jul. 1, 2025

(54) MEMORY WEAR LEVELING

(71) Applicant: Hewlett Packard Enterprise Development LP, Spring, TX (US)

(72) Inventors: Gary Smerdon, Los Gatos, CA (US); Isaac R. Nassi, Los Gatos, CA (US); David P. Reed, Los Gatos, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/329,251

(22) PCT Filed: Jan. 11, 2023

(86) PCT No.: PCT/US2023/060465
§ 371 (c)(1),
(2) Date: Jun. 5, 2023

(87) PCT Pub. No.: WO2023/137317
PCT Pub. Date: Jul. 20, 2023

(65) Prior Publication Data
US 2024/0354243 A1 Oct. 24, 2024

Related U.S. Application Data (60) Provisional application No. 63/345,695, filed on May 25, 2022, provisional application No. 63/298,581, filed on Jan. 11, 2022.

(51) Int. Cl.
*G06F 12/02* (2006.01)
(52) U.S. Cl.
CPC .................. *G06F 12/023* (2013.01)

(58) Field of Classification Search
CPC ..................................................... G06F 12/023
USPC ........................................................... 711/105
See application file for complete search history.

(56) References Cited

U.S. PATENT DOCUMENTS

| | | |
|---|---|---|
| 10,623,479 B2 | 4/2020 | Nassi |
| 10,788,994 B1 * | 9/2020 | Harwood .............. G06F 3/0604 |
| 2017/0286176 A1 | 10/2017 | Artman et al. |
| 2018/0189189 A1 * | 7/2018 | Jain ......................... G06F 3/067 |
| 2019/0171387 A1 * | 6/2019 | Willhalm ............ G06F 12/0246 |
| 2020/0201757 A1 * | 6/2020 | Diep .................... G06F 12/126 |
| 2021/0011777 A1 | 1/2021 | Nassi et al. |

(Continued)

FOREIGN PATENT DOCUMENTS

WO 2019/099358 A1 5/2019

OTHER PUBLICATIONS

Fan et al., WL-Reviver: A Framework for Reviving any Wear-Leveling Techniques in the Face of Failures on Phase Change Memory, Sep. 2014 (12 pages).

(Continued)

*Primary Examiner* — Hua J Song
(74) *Attorney, Agent, or Firm* — Fletcher Yoder, P.C.

(57) ABSTRACT

In some examples, based on the information relating to the wear of physical memories in computer nodes of the distributed system, a system initiates a migration of a memory page from a first physical memory in a first computer node to a second physical memory in a second computer node. As part of the migration, the system updates a mapping between a first address space accessible by programs in the distributed system and a physical address space comprising memory locations in the physical memories.

20 Claims, 6 Drawing Sheets

(56) References Cited

U.S. PATENT DOCUMENTS

2021/0397471 A1   12/2021   Duarte Cardoso et al.
2022/0229688 A1   7/2022    Dang et al.

OTHER PUBLICATIONS

Infineon, AN98521, Wear Leveling Mar. 19, 2021 (9 pages).
International Search Report and Written Opinion received for PCT Patent Application No. PCT/US2023/060465, mailed on May 15, 2023, 3 pages.
Jung et al., A Group-Based Wear-Leveling Algorithm for Large-Capacity Flash Memory Storage Systems, 2007 (5 pages).
Micron, TN-29-42: Wear-Leveling Techniques in NAND Flash Devices Introduction, Wear-Leveling Techniques in NAND Flash Devices, 2008 (8 pages).
Wikipedia, Wear leveling last edited Oct. 21, 2022 (5 pages).

\* cited by examiner

MEMORY WEAR LEVELING

CROSS REFERENCE TO RELATED APPLICATIONS

This application claims the benefit under 35 U.S.C. § 119 (e) of PCT Application No. PCT/US2023/060465 filed Jan. 11, 2023 which claims priority to U.S. Provisional Application No. 63/298,581, entitled "Wear-Leveling of DRAM in Computers," filed Jan. 11, 2022, and U.S. Provisional Application No. 63/345,695, entitled "Wear-Leveling of Memory," filed May 25, 2022, which are both hereby incorporated by reference in their entirety.

BACKGROUND

A distributed system includes multiple computer nodes that can run in parallel to provide increased processing throughput as compared to single-node systems. The computer nodes can execute respective programs that are to perform corresponding operations.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Reliable operation of computer nodes is important to ensure that programs such as applications continue to operate. The cost of downtime of the programs can be high, and can lead to lost revenue, dissatisfied customers, operational disruptions, and so forth.

Computer nodes include physical memory devices, such as dynamic random access memory (DRAM) devices, static random access memory (SRAM) devices, and/or other types of memory devices. Physical memory devices may exhibit data errors that can lead to failure of computer nodes. A data error occurs if one or more bits of the data read from a physical memory device is corrupted (i.e., the one or more bits of the data have a value different from a value written to the physical memory device). Data errors may be correctable or uncorrectable. A correctable data error can be corrected using an error-correction code (ECC), for example. An uncorrectable data error cannot be corrected using an ECC. Uncorrectable data errors can lead to loss of data and/or a fault during an operation of a computer node.

As the density of physical memory devices such as DRAM devices have continued to increase, the reliability of the physical memory devices has decreased due to shrinking process geometries. Also, as data storage requirements for increasingly powerful computer nodes have increased, the capacity of physical memory devices incorporated into the computer nodes has also increased, which has aggravated the reliability issues associated with errors in the physical memory devices. The probability of encountering an uncorrectable error can increase as greater amounts of data are stored in physical memory devices.

In a distributed system with a large quantity of computer nodes (e.g., tens of computer nodes, hundreds of computer nodes, thousands of computer nodes, millions of computer nodes, etc.), the reduced reliability of physical memory devices has increased the likelihood that an unrecoverable error will occur somewhere in the distributed system.

In accordance with some implementations of the present disclosure, techniques or mechanisms are provided to track wear of a physical memory in a distributed system, and to perform wear leveling of the physical memory by migrating memory pages between computer nodes. Based on tracked information relating to wear of the physical memory, a migration of a memory page between a physical memories in different computer nodes can be performed.

As part of the migration, a mapping between a first address space (e.g., a virtual address space, a guest physical memory address space, etc.) and a physical address space is updated. Migrating a memory page between computer nodes causes the memory page to be moved from a first physical memory to a second physical memory, which triggers an update of the mapping since the memory page has been moved between different physical memory locations.

By performing memory wear leveling, techniques or mechanisms according to some implementations of the present disclosure can reduce the usage of physical memory portions that are more likely to fail, which can extend the life of the physical memory and reduce the likelihood of system failure. The memory wear leveling can adjust the mapping between the first address space and the physical address space is adjusted as to ensure usage patterns are not overly concentrated in a specific physical memory location and thus prematurely wearing out the specific physical memory location.

A "physical address space" includes physical addresses that identify physical memory locations in a physical memory.

A "virtual address space" includes virtual addresses (also referred to as "logical addresses") of a virtual memory presented by an operating system (OS) to programs (e.g., application programs) in a computer node. In a non-virtualized environment (i.e., a computing environment that does not employ virtual machines (VMs)), a virtual address space is mapped by the OS to the physical address space.

In a virtualized environment that includes one or more VMs each with a respective guest OS, the virtual address space is mapped by each guest OS to a corresponding region of a guest physical address space that refers to locations of a guest physical memory. The guest physical memory is in turn mapped to a real physical memory. From the point of view of the guest OS, the guest physical memory is treated as a physical memory. However, the guest physical memory is actually virtual memory provided by a hypervisor or a hyper-kernel of a software-defined server (SDS) that manages the lifecycle of VM(s) and allocation of hardware resources to the VM(s). The guest OS allocates segments of guest physical memory to processes, which enables sharing of the guest physical memory by the processes. Note that in a non-virtualized environment, the guest physical memory is the same as the physical memory.

Figure 1:
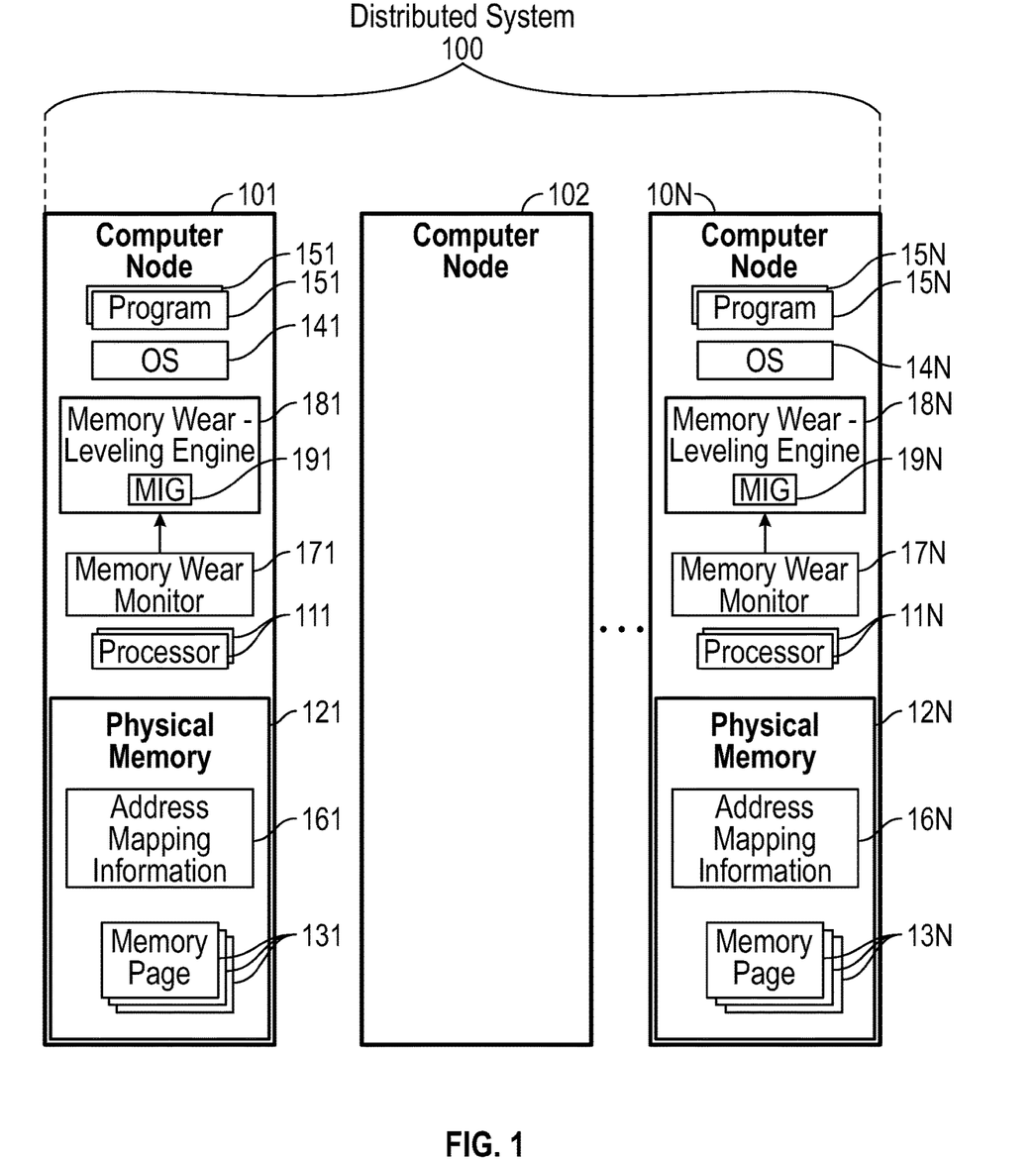
FIG. 1 is a block diagram of a non-virtualized distributed system according to some examples.

FIG. 1 is a block diagram of an example distributed system 100 that includes multiple computer nodes 101, 103, . . . , 10N, where N≥2. The distributed system 100 is a non-virtualized system. Examples of virtualized systems are discussed further below in connection with FIGS. 3 and 4.

A computer node refers to an electronic device with a processing resource capable of executing machine-readable instructions. Examples of computer nodes can include server computers, desktop computers, notebook computers, tablet computers, and so forth.

The computer node 101 includes a collection of processors 111 (a single processor or multiple processors). As used here, a "collection" of items can refer to a single item or multiple items. A processor can include a microprocessor, a core of a multi-core microprocessor, a microcontroller, a programmable integrated circuit, a programmable gate array, or another hardware processing circuit.

The computer node 101 also includes a physical memory 121, which can be implemented using a collection of physical memory devices. Data can be stored in memory pages 131 in the physical memory 121. A "memory page" can refer to any unit of data having a specified size, where the specified size can be a static size or a dynamic size. In some examples, a memory page is a unit of data that can be migrated from one physical memory to another physical memory, such as physical memories in different computer nodes.

The computer node 101 further includes an OS 141, and a collection of programs 151 (e.g., application programs). Since the example distributed system 100 is a non-virtualized system, the OS 141 is a host OS (i.e., an OS that does not run in a VM). Examples of OSes include any or some combination of the following: a Linux OS, a Microsoft WINDOWS OS, a Mac OS, a FreeBSD OS, and so forth. The application program(s) 151 and the OS 141 are executable on the collection of processors 111.

A program 151 can access (read or write) data in a memory page 131 in the physical memory 121. The OS 141 can present a virtual address space including virtual addresses that are used by a program 151 to access data in the physical memory 121. The program 151 can issue an access request (e.g., a read request or write request) that includes a virtual address of data that is the subject of the access.

The OS 141 maintains address mapping information 161 that maps virtual memory addresses of the virtual address space to physical memory addresses of a physical address space associated with the physical memory 121. The address mapping information 161 can be store in the physical memory 121 or in another memory, such as a cache memory. In some examples, the address mapping information 161 includes page tables.

When a program 151 executing on a processor 111 issues a request to access data at a given virtual memory address, the OS 141 uses the address mapping information 161 to map the given virtual memory address of the request to a corresponding physical memory address that is used to access data in the physical memory 121, such as data in a memory page 131.

The computer node 101 further includes a memory wear monitor 171 that is to monitor wear of the physical memory 121. Examples of how the wear monitoring can be performed are discussed further below. The memory wear monitor 171 can be implemented as part of a memory controller (not shown) in the computer node 101, for example. The memory controller manages access of the physical memory 121 in response to access requests received from a processor 111. Alternatively, the memory wear monitor 171 can be implemented using machine-readable instructions, such as machine-readable instructions executable on a processor 111.

In accordance with some implementations of the present disclosure, the computer node 101 further includes a memory wear leveling engine 181 that requests and receives wear information relating to wear of the physical memory 121 from the memory wear monitor 171. Based on the wear information, the memory wear leveling engine 181 performs a wear leveling operation. In some examples of the present disclosure, the wear leveling operation can include migrating a collection of memory pages 131 (a single memory page or multiple memory pages) from the physical memory 121 in the computer node 101 to a physical memory of another computer node (or physical memories of other computer nodes).

As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits.

In some examples, the memory wear-leveling engine 181 can be implemented as part of the OS 141. In other examples, the memory wear-leveling engine 181 can be implemented in other layers, including a virtualization layer (e.g., as part of a hypervisor or a hyper-kernel), an application layer that includes application programs, or a hardware layer including hardware devices.

The memory wear-leveling engine 181 can include a migration controller 191 to control a migration of a memory page from the computer node 101 to one or more target computer nodes. In other examples, the migration controller 191 can be separate from the memory wear-leveling engine 181. As part of the migration of a memory page to perform memory wear leveling, the memory wear-leveling engine 181 can update the address mapping information 161 to map a virtual address (or more generally, a collection of virtual addresses) to a physical address (or more generally, a collection of physical addresses) in the one or more target computer nodes.

Prior to the migration for memory wear leveling, the collection of virtual addresses would be mapped by the address mapping information 161 to a collection of physical addresses of the physical memory 121. After the migration for memory wear leveling, the collection of virtual addresses would be mapped by the address mapping information 161 to a collection of physical addresses of a physical memory in one or more target computer nodes. After the migration, a process (e.g., a process of a program 151 or the OS 141) running in the computer node 101 that accesses data at a given virtual address of the collection of virtual addresses would result in the data being retrieved from a target computer node due to the updated address mapping information 161 mapping the given virtual address to a physical address of the target computer node. For example, the memory controller (not shown) in the computer node 101 can be configured to implement remote direct memory access (RDMA) to retrieve data from a remote physical memory in the target computer node.

In some examples, the memory wear-leveling engine 181 can perform the re-mapping of virtual addresses to physical addresses using any of various schemes, such as a random scheme (in which a target computer node is selected at random), a round robin scheme (in which a target computer node is selected based on a round robin selection arrangement in which computer nodes are selected as targets for memory page migration successively), and so forth.

In addition to being able to initiate a memory page migration to perform memory wear leveling, the memory wear-leveling engine 181 can also perform memory wear leveling within the computer node 101 by moving one more memory pages 131 between different memory locations of the physical memory 121. This can also be accomplished by updating the address mapping information 161, to change the mapping from a collection of virtual addresses to a collection of physical addresses.

In some examples, the computer node 10N includes similar components as the computer node 101. The computer node 10N includes a collection of processors 11N and a physical memory 12N. Memory pages 13N can be stored in the physical memory 12N. The computer node also includes an OS 14N, and a collection of programs 15N executable on the collection of processors 11N.

Address mapping information 16N can be maintained by the OS 14N to map between a virtual memory address space and a physical address space. The computer node 10N also includes a memory wear monitor 17N that can monitor wear of the physical memory 12N. The memory wear monitor 17N provides wear information relating to wear of the physical memory 12N to a memory wear-leveling engine 18N, which can trigger a memory leveling operation. For example, the memory wear-leveling engine 18N can include a migration controller 19N to migrate a memory page from the physical memory 12N to another computer node.

Although not depicted, the computer node 103 also includes similar components.

Memory wear leveling initiated by a memory wear-leveling engine (e.g., 181 to 18N) causes a change in a pattern of memory access of a physical memory. Memory wear leveling is performed to avoid over-stressing a particular area of a physical memory, such as the area of a physical memory used to store a memory page.

A physical memory device such as a DRAM, an SRAM, or another type of memory device can include a large quantity of memory cells. A physical memory implemented with a collection of physical memory devices can include billions or trillions of memory cells. Failure of circuitry (e.g., including transistors or other circuit elements) of any of the memory cells can lead to uncorrectable data errors that can lead to a system crash. Memory wear leveling spreads usage of the memory cells of a physical memory more evenly, so that the impact of high utilization can be spread across all of the physical memory devices of the distributed system 100, thus extending the life of the physical memory devices and reducing the chance of a catastrophic failure of the distributed system 100.

In addition to spreading usage of memory cells to spread wear, techniques or mechanisms according to some implementations of the present disclosure allow for working around areas of physical memory that may be "weak" or more susceptible to failure or wear. An example would be a physical memory area that has initially experienced a correctable error that is correctable using an ECC. Although this physical memory area can still be used, usage of this physical memory area should be reduced since the physical memory area has shown signs of excess wear. Also, by monitoring a large quantity of computer nodes, it may be observed that some areas of physical memory are more vulnerable. Information relating to the observed vulnerable physical memory areas can be proactively fed into a wear-leveling engine. In some cases, information relating to vulnerable physical memory areas may be from a source that is outside of the distributed system 100. For example, the source of information may be information relating to manufacturing or design issues associated with specific physical memory devices from a particular vendor. For example, the information relating to manufacturing or design issues can indicate that certain physical regions of a memory device manufactured by the particular vendor has reliability issues. Such issues can be mitigated by implemented wear leveling with the wear-leveling engines.

In further examples, memory wear leveling as discussed herein can be applied with respect to DRAMs within a single computer node. Wear information relating to a DRAM can be collected by a wear-leveling engine in the computer node, and address mapping information can be updated between virtual addresses and physical addresses to move data from one area of the DRAM to another area of the DRAM. The collected wear information can be collected within the computer node, such as by a memory wear monitor, or alternatively, can be collected from a source outside the computer node (as discussed above).

Memory wear leveling is performed in a way that does not affect processes (processes of programs or an OS) running in a computer node except perhaps that the computer node may experience reduced performance resulting from the overhead of moving contents of memory. In some examples, memory wear leveling is accomplished by changing the mapping (e.g., address mapping information 161 to 16N) between a physical address space of physical memory devices (that are part of the physical memories 121 to 12N) and a second address space, such as a virtual address space or a guest physical memory address space. In some examples, memory wear leveling is performed in a way that is not visible to any program (e.g., 151 to 15N) or even to an OS (if run in an SDS, discussed further below).

Figure 2:
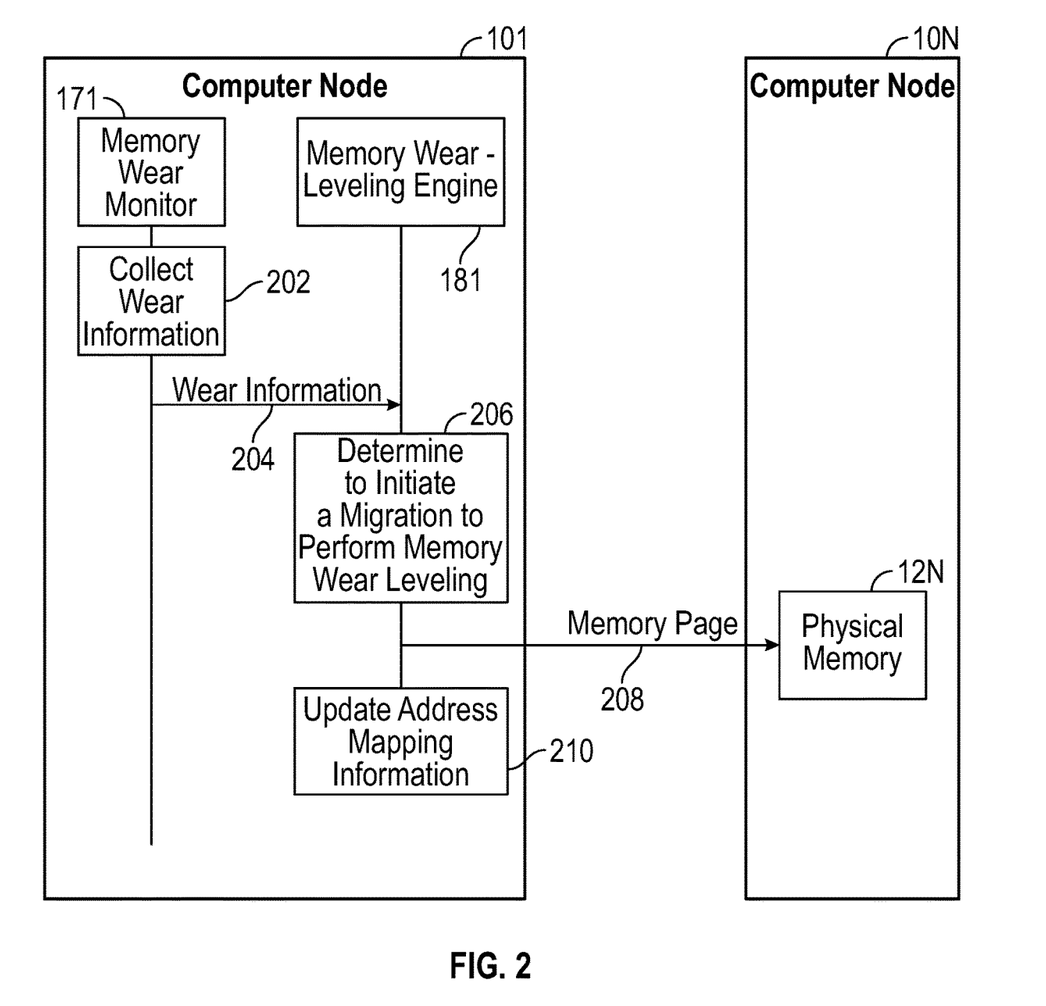
FIG. 2 is a flow diagram of a memory wear-leveling technique according to some examples.

FIG. 2 is a flow diagram of a wear leveling technique according to some examples of the present disclosure. FIG. 2 depicts tasks involving the computer node 101 and 102N. In other examples, similar tasks can be performed by other computer nodes. In other examples, the tasks of FIG. 2 can be performed in a different order from the order depicted, and/or additional or alternative tasks can be performed.

The memory wear monitor 171 in the computer node 101 collects (at 202) wear information relating to wear of the physical memory 121 in the computer node 101. Further details of examples of wear information are discussed below. The memory wear monitor 171 provides (at 204) the wear information to the memory wear-leveling engine 181. Based on the wear information, the memory wear-leveling engine 181 determines (at 206) to initiate a memory page migration to perform memory wear leveling.

The migration controller 191 in the memory wear-leveling engine 181 moves (at 208) a memory page to the physical memory 12N of the computer node 10N, as part of the migration initiated by the memory wear-leveling engine 181 for memory wear leveling. The memory wear-leveling engine 181 also updates (at 210) the address mapping information 161, to update the mapping of a collection of virtual addresses associated with the migrated memory page to refer to a collection of physical addresses of the physical memory 121N in the computer node 10N.

Figure 3:
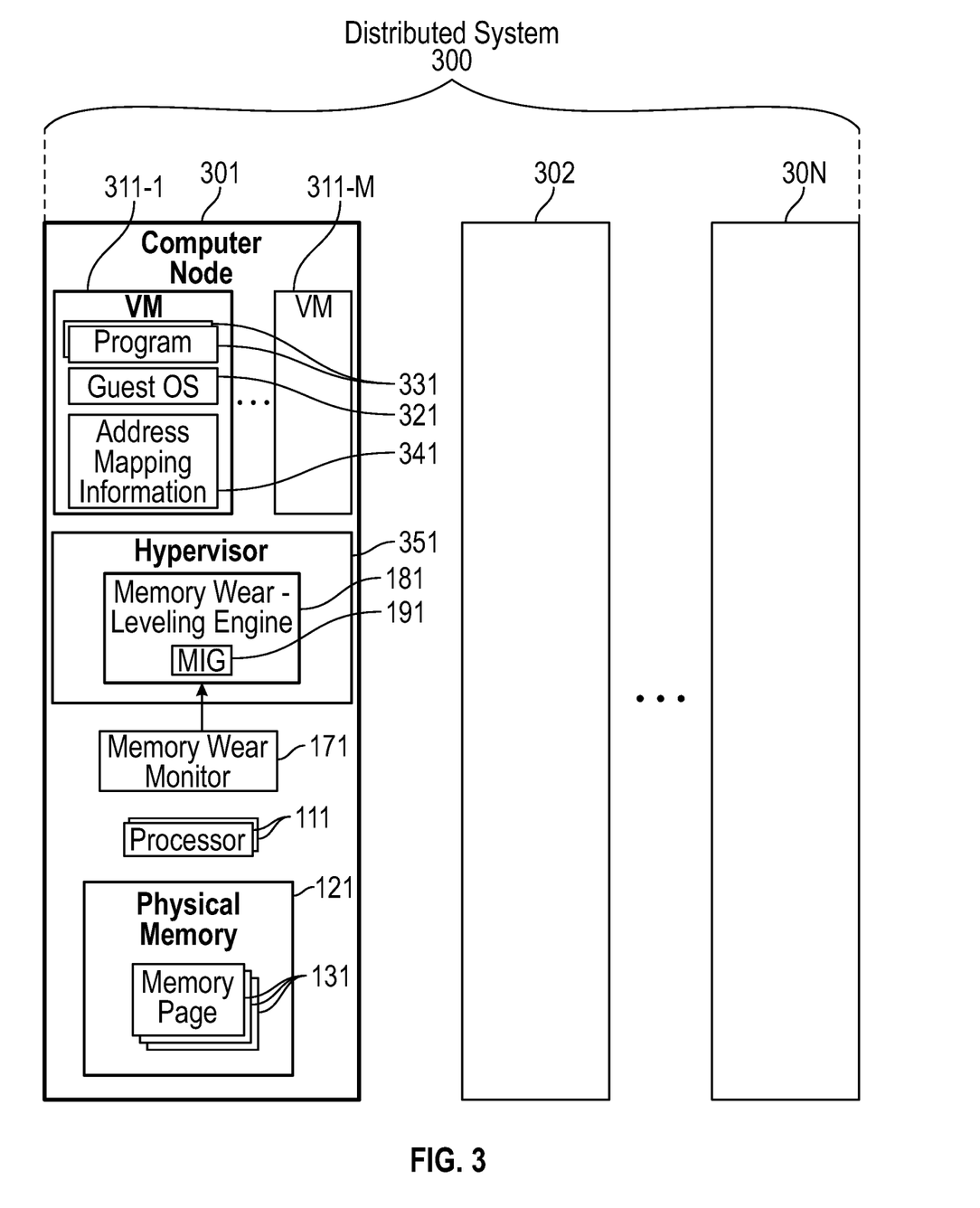
FIGS. 3 and 4 are block diagrams of virtualized distributed systems according to some examples.

FIG. 3 is a block diagram of a virtualized distributed system 300 according to some examples. The distributed system 300 includes computer nodes 301, 302, . . . , 30N (N≥2). Each computer node of the distributed system 300 includes VMs. For example, the computer node 301 includes VMs 311-1 to 311-M, where M≥1, that are executable on the collection of processors 111 of the computer node 301. The computer nodes 302 to 30N can include similar components as the computer node 301.

The VM 311-1 includes a guest OS 321 and a collection of programs 331 that are executable in the VM 311-1. Address mapping information 341 is also provided for the VM 311-1 that maps between guest physical addresses of a guest physical memory address space of the VM 311-1 and physical addresses of a physical address space. The guest physical address space refers to locations of a guest physical memory. From the point of view of the guest OS 321, the guest physical memory is treated as a physical memory. However, the guest physical memory is actually virtual memory provided by a hypervisor 351 in the computer node 301. The hypervisor 351 manages the sharing of the physical memory 121 in the computer node 301 among the VMs 311-1 to 311-M. The VM 311-M can include similar components as the VM 311-1.

In some examples, the hypervisor 351 includes the memory wear-leveling engine 181 that performs similar operations as the memory wear-leveling engine 181 of FIG. 1. In other examples, the memory wear-leveling engine 181 can be external of the hypervisor 351.

The computer node 301 also includes a memory wear monitor 171 that collects wear information relating to the physical memory 121 and provides the wear information to the memory wear-leveling engine 181. In response to the wear information, the memory wear-leveling engine 181 can initiate a memory page migration for memory wear leveling to migrate the memory page from the physical memory 121 of the computer node 301 to one or more target computer nodes. The memory wear-leveling engine 181 can update the address mapping information 341 as part of the memory page migration, to change the mapping of a collection of guest physical memory addresses for the migrated memory page to a collection of physical addresses referring to memory locations in the one or more target computer nodes.

Figure 4:
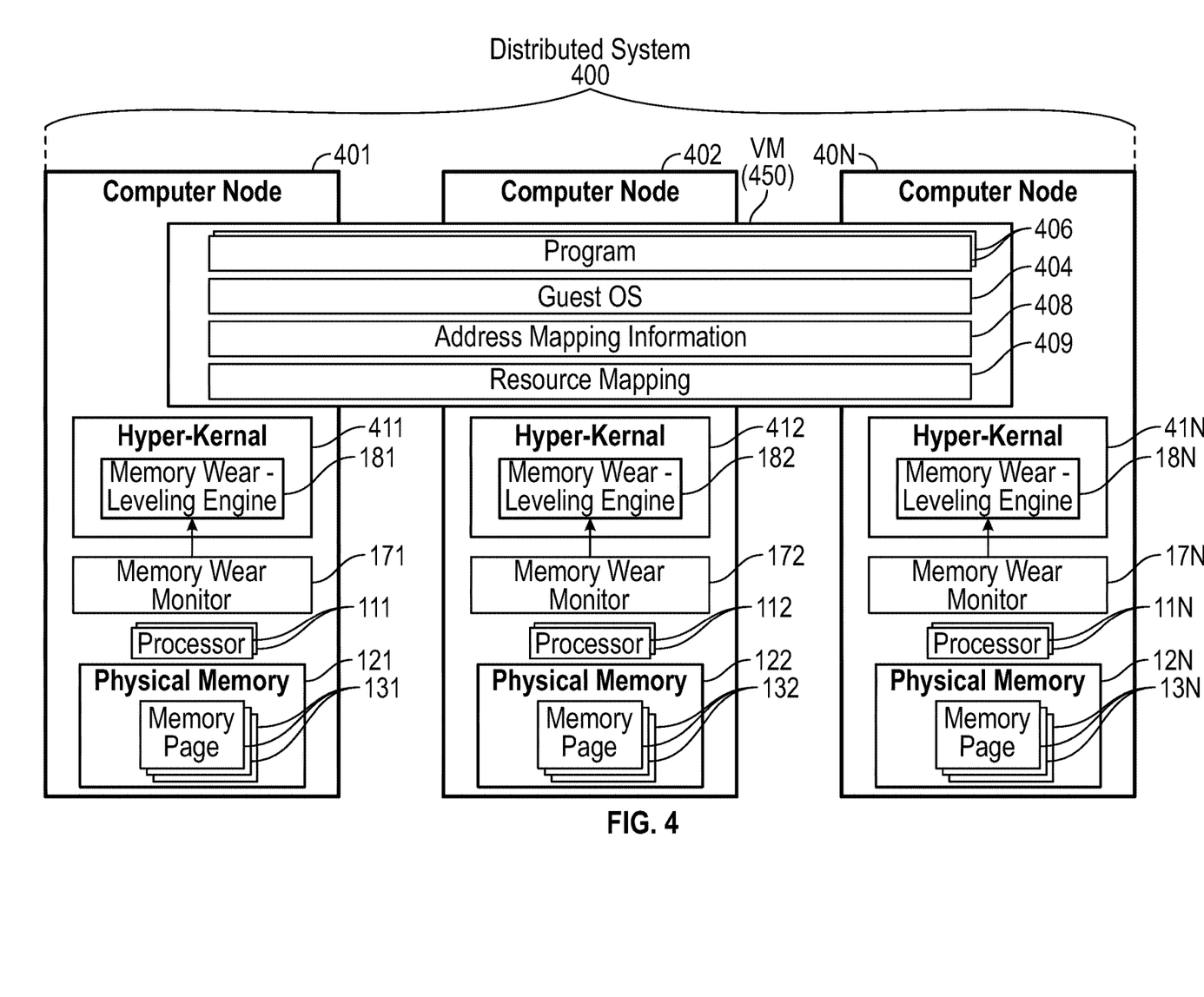

FIG. 4 is a block diagram of a virtualized distributed system 400 according to further examples. In the distributed system 400, instead of running one or more VMs in each respective computer node, a VM 450 can run across multiple computer nodes 401, 402, . . . , 40N (N≥2). Although FIG. 4 shows one VM 450, note that there can be at least one other VM that can run across the multiple computer nodes 401 to 40N. The arrangement of FIG. 4 is also referred to as an SDS (software-defined server), since the computer nodes 401 to 40N collectively form one virtual machine (VM 450) that hosts a guest OS (OS 404).

The VM 450 includes a guest OS 404 and a collection of programs 406 that run in the VM 450. Address mapping information 408 is maintained for the VM 450 that maps guest virtual memory addresses of a guest physical memory address space that refers to locations of a host virtual memory to physical addresses of a hyper-kernel physical address space. The hyper-kernel physical address space is a physical address space provided by a hyper-kernel. From the point of view of the guest OS 404, the guest physical memory is treated as a physical memory. However, the guest physical memory is actually virtual memory provided by hyper-kernel 411, 412, . . . , 41N running in respective computer nodes 401, 402, . . . , 40N.

A hyper-kernel is software on each physical computer node that functions as part of a distributed hypervisor. The hyper-kernels 411 to 41N communicate with each other to collectively perform tasks of a hypervisor. Each hyper-kernel can observe the distributed system 400 running in real time and optimizes system resources of the respective computer nodes 101, 102, . . . , 10N to match the requirements of the distributed system 400 during operation. The hyper-kernels 411 to 41N unify the hardware resources of the computer nodes 401 to 40N, and presents the unified set to the guest OS 404. The hardware resources include the processors 111, 112, . . . , 11N, physical memories 121, 122, . . . , 12N, and other resources (e.g., network communication resources, input/output (I/O) resources, etc.) of the respective computer nodes 401, 402, . . . , 40N. Because of this abstraction, the guest OS 404 will have the view of a single large computer, containing an aggregated set of processors, memories, I/O resources, network communication resources, and so forth.

In some examples, each hyper-kernel includes a respective memory wear-leveling engine. For example, the hyper-kernel 411 includes the memory wear-leveling engine 181, the hyper-kernel 412 includes the memory wear-leveling engine 182, and the hyper-kernel 41N includes the memory wear-leveling engine 18N. Each of the memory wear-leveling engines 181 to 18N performs similar operations as the memory wear-leveling engine 181 of FIG. 1. In other examples, the memory wear-leveling engines 181 to 18N can be external of the hyper-kernels 411 to 41N.

Each computer node also includes a memory wear monitor that collects wear information relating to a respective physical memory and provides the wear information to the respective memory wear-leveling engine. For example, the computer node 401 includes the memory wear monitor 171 that collects wear information relating to the physical memory 121 and provides the wear information to the memory wear-leveling engine 181, the computer node 402 includes the memory wear monitor 172 that collects wear information relating to the physical memory 122 and provides the wear information to the memory wear-leveling engine 182, and the computer node 40N includes the memory wear monitor 17N that collects wear information relating to the physical memory 12N and provides the wear information to the memory wear-leveling engine 18N. In other examples, the memory wear-level engine 182 can track error rates rather than memory usage information.

In response to the wear information from a respective memory wear monitor 17$i$ (i=1 to N), the memory wear-leveling engine 18$i$ can initiate a memory page migration for memory wear leveling to migrate the memory page from the physical memory 12$i$ of the computer node 30$i$ to one or more target computer nodes. The memory wear-leveling engine 18$i$ updates the address mapping information 408 as part of the memory page migration, to change the mapping of a collection of guest physical memory addresses of a guest physical memory address space to a collection of physical addresses referring to memory locations in the one or more target computer nodes. The guest physical address memory space refers an aggregate of memory locations in the physical memories 121 to 12N of the computer nodes 401 to 40N.

The guest OS 404 in the VM 450 is presented with virtual processors (also referred to as virtual central processing units or vCPUs) that are virtualized representations of the physical processors 111 to 11N as presented by the distributed hypervisor made up of the hyper-kernels 411 to 41N. As an example, if there are five computer nodes and each computer node has 100 physical processors, then distributed hypervisor presents the guest OS 404 with 500 virtual processors that are part of a single SDS. In actuality, there are five physical computer nodes each with 100 physical processors.

In addition to being able to migrate memory pages, the distributed hypervisor can also migrate virtual processors. Migrating a virtual processor refers to updating a resource mapping 409 between the virtual processor and a physical processor. Prior to the migration of the virtual processor, the resource mapping 409 can map the virtual processor to a first physical processor in a first computer node. After the migration of the virtual processor, the resource mapping 409 can map the virtual processor to a second physical processor in a second computer node different from the first computer node. In further examples, virtual processor migration can also migrate a virtual processor between different physical processors of the same computer node.

In some examples of the present disclosure, in response to migrating a memory page from a first computer node to a second computer for memory wear leveling, the distributed hypervisor can also migrate a virtual processor (that accesses the memory page) from the first computer node to the second computer node, by updating the resource mapping 409. Migrating the virtual processor with the memory page allows the memory page and the physical processor mapped to the virtual processor to be part of the same computer node, for increased efficiency.

A virtual processor can be implemented as an application thread in a hyper-kernel. The virtual processor can be asleep while waiting for a request to perform a computation. When the request is received, the virtual processor is awakened and placed in a ready-to-run queue from which the virtual processor can be dispatched to run on a corresponding physical processor.

The following describes examples of how a memory wear monitor (171 to 17N) can measure wear of a physical memory. As examples, measuring wear includes measuring cumulative use and intensity of use of a physical memory. Wear can be caused either by cumulative access of a physical memory device over its lifetime, or by intensive access of the physical memory device (e.g., memory access is more intensive if there is a greater amount of memory accesses in a unit time). In some examples, the memory wear-leveling techniques described herein can address both forms of memory access that can lead to memory wear.

In some examples, memory wear may be measured by the physical memory device itself (e.g., by a measurement device on a memory module such as a dual inline memory module). The measurement device (that is part of the memory wear monitor) can include one or more counters that each counts the number of accesses of the physical memory device or a portion of the physical memory device. Alternatively, rather than track memory accesses, the measurement device can track recoverable memory errors. Each counter can maintain the count in a register, which can be read (e.g., by a memory wear-leveling engine) over a control channel such as a System Management Bus (SMB) or another type of control channel.

In further examples, memory wear may be measured by a physical processor that issues memory access requests to a memory controller. The physical processor can maintain counts of accesses of respective physical addresses. In these further examples, the counters of the physical processor are part of the memory wear monitor.

In other examples, memory wear can be approximated by a software-implemented sampling algorithm that periodically samples what addresses are being accessed. When a virtual processor references a memory page that is not mapped on the same computer node as the executing physical processor, the hardware of a respective computer node on which the virtual processor executes delivers a virtual memory mapping fault that is delivered to the hyper-kernel on the respective computer node. If the physical processor is an Intel processor, the virtual memory mapping fault can be an Extended Page Table (EPT) fault. If the physical processor is an Advanced Micro Devices (AMD) processor, the fault can be a Nested Page Table fault. Other processors (such as ARM processors or Reduced Instruction Set Computer (RISC)-V processors) have similar mechanisms to handle faults. When a virtual memory mapping fault occurs, the memory wear monitor can sample the accessed virtual addresses and determine the corresponding physical addresses mapped to the accessed virtual addresses. In this way, the memory wear monitor can track the accessed physical addresses (accessed by programs in a VM) across multiple faults.

A memory wear-leveling engine gathers measurements of wear on respective portions of a physical memory, based on the wear information collected by the memory wear monitor. The cumulative wear can be stored as part of historical access information relating to accesses of the physical memory. For example, if the cumulative wear of a portion of a physical memory exceeds a threshold, then a memory wear-leveling operation can be initiated by the memory wear-leveling engine. A "portion of a physical memory" can refer to any defined portion, such as a subset of the physical memory (corresponding to a range of physical addresses).

As another example, if an intensity of wear of a portion of a physical memory exceeds a threshold (e.g., the rate of access of the portion of the physical memory exceeds a threshold), the memory wear-leveling engine can initiate a memory wear-leveling operation.

Collected wear information can be persisted across resets of a computer node by storing the collected wear information in a persistent storage. When a physical memory is replaced with a new physical memory, the collected wear information can be reset to restart the monitoring of wear relating to the new physical memory.

In further examples, a memory wear-leveling engine can determine that a portion of a physical memory is wearing out based on correctable error reporting by a memory wear monitor. The memory wear monitor can detect occurrences of data errors that have been corrected, and can provide indications of such correctable data errors to the memory wear-leveling engine. If the correctable data errors occur at a rate that exceeds a threshold (e.g., the quantity of correctable data errors within a given unit of time exceeds the threshold), the memory wear-leveling engine can determine that the portion of the physical memory in which the correctable data errors are occurring is likely exhibiting wear.

In further examples, the memory wear-leveling engine can perform diagnostic tests of portions of a physical memory to determine whether the portions of the physical memory are exhibiting wear. The diagnostic tests can include writing data patterns to the portions of the physical memory to detect whether data errors occur at greater than a threshold amount.

In some examples, a memory wear-leveling engine can initiate memory wear leveling (including memory page migration) at any of various different times. For example, the memory wear-leveling engine can initiate the memory wear leveling at startup of a computer node (e.g., after a reset or as part of a power cycle). As another example, the memory wear-leveling engine can initiate the memory wear leveling periodically or in response to other events. As a further example, the memory wear-leveling engine can initiate the memory wear leveling after a specified amount of memory usage has been recorded.

Figure 5:
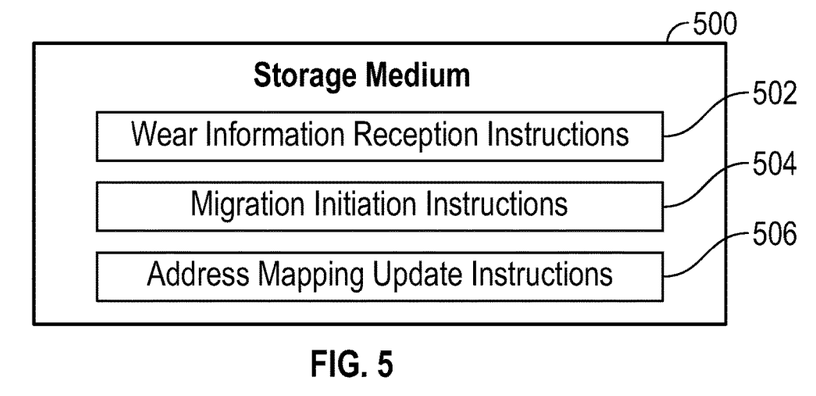
FIG. 5 is a block diagram of a storage medium storing machine-readable instructions according to some examples.

FIG. 5 is a block diagram of a non-transitory machine-readable or computer-readable storage medium 500 that stores machine-readable instructions that upon execution cause a distributed system (e.g., 100, 300, or 400) to perform various tasks.

The machine-readable instructions include wear information reception instructions 502 to receive information relating to wear of physical memories in computer nodes of the distributed system. In some examples, the wear information includes information relating to correctable errors in the physical memories. In further examples, the wear information includes information relating to cumulative access or intensity of access of the physical memories.

The machine-readable instructions include migration initiation instructions 504 to, based on the information relating to the wear, initiate a migration of a memory page from a first physical memory in a first computer node to a second physical memory in a second computer node. In some examples, the initiating of the migration of the memory page is by a hypervisor or a hyper-kernel in the first computer node.

The machine-readable instructions include address mapping update instructions 506 to, as part of the migration, update a mapping between a first address space accessible by programs in the distributed system and a physical address space comprising memory locations in the physical memories. In some examples, the first address space is a virtual address space comprising virtual addresses in a virtual memory. In further examples, the first address space is a guest physical memory address space of a guest physical memory accessible by one or more guest OSes in a virtualized environment.

In some examples, the wear information is from hardware in the computer nodes. In further examples, the wear information is from a sampling program that samples virtual memory addresses accessed and determines physical memory addresses corresponding to the virtual memory addresses.

In some examples, the plurality of computer nodes form a software-defined server (SDS), and the distributed system migrates a virtual processor from the first computer node to the second computer node in conjunction with the migration of the memory page.

Figure 6:
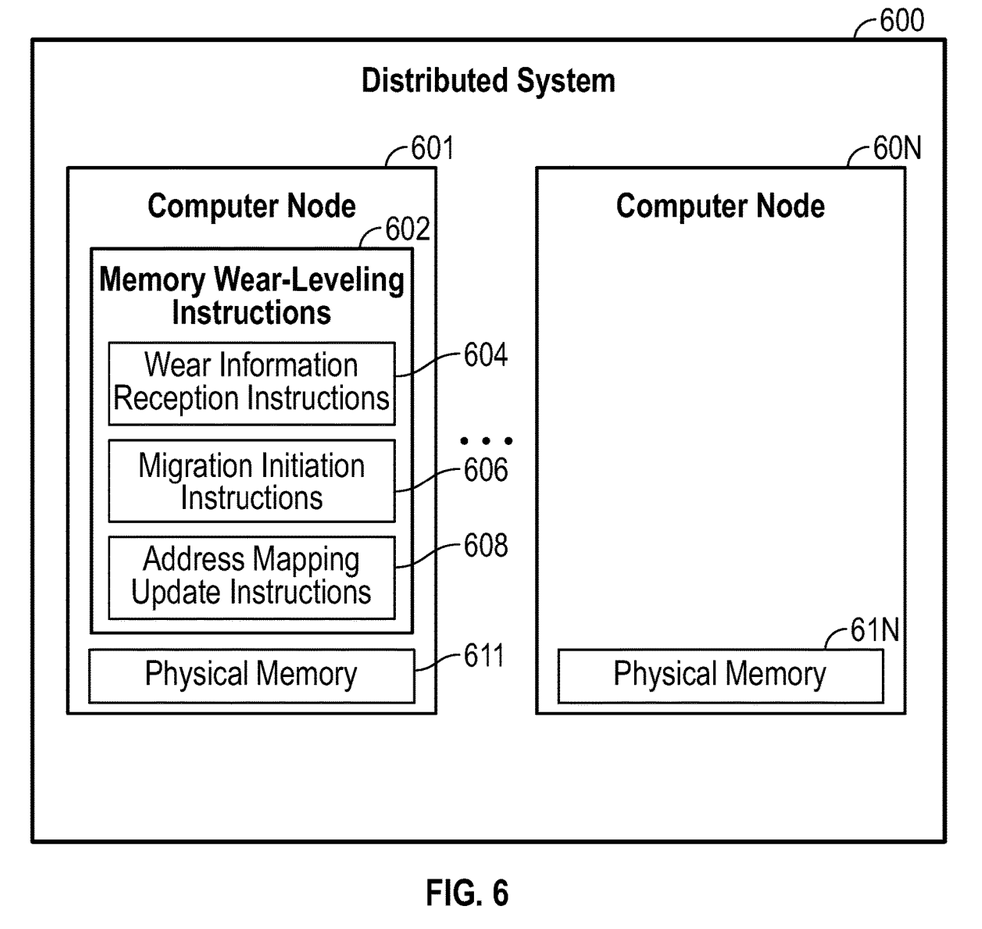
FIG. 6 is a block diagram of a distributed system according to some examples.

FIG. 6 is a block diagram of a distributed system 600 including a plurality of computer nodes 601 to 60N (N≥2), where each computer node of the plurality of computer nodes includes a respective physical memory 611 to 61N. The computer node 601 includes memory wear-leveling instructions 602 executable in the computer node 601 to perform various tasks. The memory wear-leveling instructions 602 can be stored in a storage medium and executed on a collection of processors.

The memory wear-leveling instructions 602 include wear information reception instructions 604 to receive information relating to wear of the physical memory 611 in the computer node 601.

The memory wear-leveling instructions 602 include migration initiation instructions 606 to, based on the information relating to the wear, initiate a migration of a memory page from the physical memory 611 in the computer node 601 to the physical memory 61N in the computer node 60N.

The memory wear-leveling instructions 602 include address mapping update instructions 608 to, as part of the migration, update a mapping 610 between a first address space accessible by a program and a physical address space comprising memory locations in the physical memories 611 to 61N. In some examples, the updating of the mapping 610 changes a mapping between a first virtual address of the memory page from a first physical address of the physical memory 611 to a physical address of the physical memory 61N. In further examples, the updating of the mapping 610 changes a mapping between a first guest memory address of the memory page from a first physical address of the physical memory 611 to a second physical address of the physical memory 61N.

Figure 7:
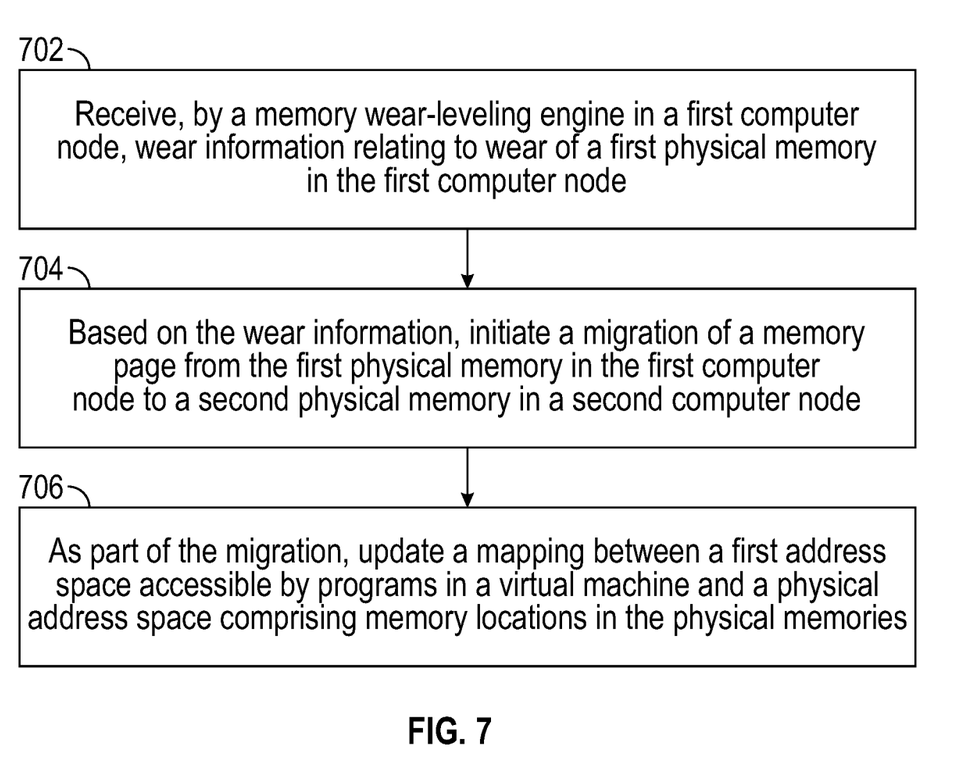
FIG. 7 is a flow diagram of a memory wear-leveling technique according to further examples.

FIG. 7 is a flow diagram of a memory wear-leveling technique according to some examples, which can be performed in a distributed system. A memory wear-leveling engine in a first computer node of a plurality of computer nodes receives (at 702) wear information relating to wear of a first physical memory in the first computer node. The wear information can be from hardware or a program.

Based on the wear information, the distributed system initiates (at 704) a migration of a memory page from the first physical memory in the first computer node to a second physical memory in a second computer node. The initiation of the migration can be performed in a non-virtualized distributed system or a virtualized distributed system.

As part of the migration, the distributed system updates (at 706) a mapping between a first address space accessible by programs in a virtual machine and a physical or guest physical address space comprising memory locations in the physical memories. The first address space can be a virtual address space or a guest physical memory address space.

A storage medium (e.g., 500 in FIG. 5) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise.

Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a distributed system to:
   receive information relating to wear of physical memories in computer nodes of the distributed system, wherein each of the computer nodes comprise a corresponding set of hardware resources, including processing resources, remote from hardware resources of other computer nodes;
   based on the information relating to the wear, initiate a migration of a memory page from a first physical memory in a first computer node to a second physical memory in a second computer node, wherein the second physical memory is remote from the first physical memory; and
   as part of the migration, update a mapping between a first address space accessible by programs in the distributed system and a physical address space comprising memory locations in the physical memories.

2. The non-transitory machine-readable storage medium of claim 1, wherein the first address space is a virtual address space comprising virtual addresses in a virtual memory.

3. The non-transitory machine-readable storage medium of claim 1, wherein the first address space is a guest physical memory address space of a guest physical memory accessible by one or more guest operating systems (OSes) in a virtualized environment.

4. The non-transitory machine-readable storage medium of claim 1, wherein the information relating to the wear comprises information relating to correctable errors in the physical memories.

5. The non-transitory machine-readable storage medium of claim 1, wherein the information relating to the wear comprises information relating to cumulative access of the physical memories.

6. The non-transitory machine-readable storage medium of claim 1, wherein the information relating to the wear comprises information relating to intensity of access of the physical memories.

7. The non-transitory machine-readable storage medium of claim 1, wherein the information relating to the wear is from hardware in the computer nodes.

8. The non-transitory machine-readable storage medium of claim 1, wherein the information relating to the wear is from a program that samples virtual memory addresses accessed and determines physical memory addresses corresponding to the virtual memory addresses.

9. The non-transitory machine-readable storage medium of claim 1, wherein the instructions upon execution cause the distributed system to:
   migrate a virtual processor from the first computer node to the second computer node in conjunction with the migration of the memory page.

10. The non-transitory machine-readable storage medium of claim 1, wherein the initiating of the migration of the memory page is by a hyper-kernel in the first computer node.

11. The non-transitory machine-readable storage medium of claim 10, wherein the mapping is updated by the hyper-kernel.

12. The non-transitory machine-readable storage medium of claim 1, wherein the initiating of the migration of the memory page is by a hypervisor in the first computer node.

13. The non-transitory machine-readable storage medium of claim 12, wherein the mapping is updated by the hypervisor.

14. A distributed system comprising:
   a plurality of computer nodes, wherein each computer node of the plurality of computer nodes comprises a physical memory and a corresponding set of hardware resources, including processing resources, remote from hardware resources of other computer nodes,
   wherein a first computer node of the plurality of computer nodes comprises:
      memory wear-leveling instructions executable in the first computer node to:
         receive information relating to wear of a first physical memory in the first computer node,
         based on the information relating to the wear, initiate a migration of a memory page from the first physical memory in the first computer node to a second physical memory in a second computer node, wherein the second physical memory is remote from the first physical memory, and
         as part of the migration, update a mapping between a first address space accessible by a program and a physical address space comprising memory locations in the physical memories.

15. The distributed system of claim 14, wherein the updating of the mapping changes a mapping between a first virtual address of the memory page from a first physical address of the first physical memory to a second physical address of the second physical memory.

16. The distributed system of claim 14, wherein the updating of the mapping changes a mapping between a first guest memory address of the memory page from a first physical address of the first physical memory to a second physical address of the second physical memory.

17. The distributed system of claim 14, wherein the plurality of computer nodes comprise respective hyper-kernels that collectively form a distributed hypervisor, wherein the program is executable in a virtual machine distributed across the plurality of computer nodes.

18. The distributed system of claim 14, wherein the information relating to the wear comprises information relating to correctable errors in the first physical memory.

19. A method of a distributed system comprising a plurality of computer nodes, comprising:
   receiving, by a memory wear-leveling engine in a first computer node of the plurality of computer nodes, information relating to wear of a first physical memory in the first computer node, wherein each of the computer nodes comprise a corresponding set of hardware resources, including processing resources, remote from hardware resources of other computer nodes;
   based on the information relating to the wear, initiating a migration of a memory page from the first physical memory in the first computer node to a second physical memory in a second computer node, wherein the second physical memory is remote from the first physical memory; and
   as part of the migration, updating a mapping between a first address space accessible by programs in a virtual machine and a physical address space comprising memory locations in the physical memories.

20. The method of claim 19, further comprising:
migrating a virtual processor from the first computer node to the second computer node in conjunction with the migration of the memory page.

* * * * *